(12) United States Patent
Kundgol et al.

(10) Patent No.: US 9,094,473 B2
(45) Date of Patent: Jul. 28, 2015

(54) INSTALLATION OF AN ASSET FROM A CLOUD MARKETPLACE TO A CLOUD SERVER IN A PRIVATE NETWORK

(71) Applicant: International Business Machines Corporation, Armonk, NY (US)

(72) Inventors: Mohammed Asif N. Kundgol, Bangalore (IN); Vijay K. Sukthankar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 13/779,993

(22) Filed: Feb. 28, 2013

(65) Prior Publication Data

US 2014/0244799 A1      Aug. 28, 2014

(51) Int. Cl.
G06F 15/16      (2006.01)
G06F 15/173    (2006.01)
H04L 29/08     (2006.01)
H04L 29/06     (2006.01)

(52) U.S. Cl.
CPC ............ *H04L 67/32* (2013.01); *H04L 63/0209* (2013.01); *H04L 67/02* (2013.01); *H04L 67/1097* (2013.01); *H04L 67/2842* (2013.01)

(58) Field of Classification Search
CPC ..... H04L 67/32; H04L 67/10; H04L 67/1097; H04L 63/02; H04L 63/0272
USPC .................. 709/201–203, 217–219, 223–226
See application file for complete search history.

(56) References Cited

U.S. PATENT DOCUMENTS

| | | | | |
|---|---|---|---|---|
| 8,316,125 | B2* | 11/2012 | DeHaan | 709/224 |
| 8,429,716 | B2* | 4/2013 | Earl et al. | 726/3 |
| 8,806,014 | B2* | 8/2014 | Carter et al. | 709/226 |
| 2009/0300635 | A1 | 12/2009 | Ferris | |
| 2011/0191191 | A1* | 8/2011 | Bax et al. | 705/14.71 |
| 2012/0066670 | A1 | 3/2012 | McCarthy et al. | |
| 2012/0278454 | A1 | 11/2012 | Stewart et al. | |
| 2013/0238789 | A1* | 9/2013 | Bade et al. | 709/224 |
| 2014/0280961 | A1* | 9/2014 | Martinez et al. | 709/226 |
| 2014/0344461 | A1* | 11/2014 | Carter et al. | 709/226 |
| 2014/0344808 | A1* | 11/2014 | Banerjee et al. | 718/1 |

OTHER PUBLICATIONS

"Next-Generation Cloud-Based Server Monitoring and Systems Management", Scale Extreme, http://www.scalextreme.com/assets/white-papers/scalextreme-overview.pdf, printed from the Internet on Feb. 22, 2013, 7 pages.

(Continued)

*Primary Examiner* — Bharat N Barot
(74) *Attorney, Agent, or Firm* — Stephen R. Tkacs; Stephen J. Walder, Jr.; Thomas E. Tyson

(57) ABSTRACT

A mechanism is provided in a data processing system for deploying of an asset from a marketplace to a computing behind an enterprise firewall. A grabber service in a cloud management computing device in a private network behind the enterprise firewall monitors a placeholder in a file system of a marketplace server. Responsive to the grabber service finding a cloud asset deployment job stored in the placeholder, the grabber service retrieves the cloud asset deployment job. The cloud asset deployment job comprises logic for deploying a cloud asset. The mechanism downloads the cloud asset from a cloud asset repository to a cache behind the enterprise firewall according to the cloud asset deployment job. The mechanism deploys the cloud asset according to the cloud asset deployment job.

23 Claims, 5 Drawing Sheets

(56) References Cited

OTHER PUBLICATIONS

"Understanding the HP CloudSystem Reference Architecture", HP White Paper, http://h18006.www1.hp.com/storage/pdfs/4AA3-4548ENW.pdf, Jun. 2011, 20 pages.

Vernier, Dominique, "IBM SmartCloud Enterprise Tip: Deploy Products Using Rapid Deployment Service", http://www.ibm.com/developerworks/cloud/library/c1-rdsassetoncloud/, Apr. 29, 2011, 11 pages.

* cited by examiner

INSTALLATION OF AN ASSET FROM A CLOUD MARKETPLACE TO A CLOUD SERVER IN A PRIVATE NETWORK

BACKGROUND

The present application relates generally to an improved data processing apparatus and method and more specifically to mechanisms for installation of an asset from a marketplace to a cloud server behind an enterprise firewall.

Cloud computing is the use of computing resources (hardware and software) that are delivered as a service over a network (typically the Internet). Cloud computing entrusts remote services with a user's data, software and computation. Using software as a service, users also rent application software and databases. The cloud providers manage the infrastructure and platforms on which the applications run. End users may access cloud-based applications through a web browser or a light-weight desktop or mobile app while the business software and user data are stored on servers at a remote location.

An enterprise may have a private network, or intranet, that is isolated from the Internet by a firewall, which can either be software-based and/or hardware-based. A firewall is used to help keep a network secure. Its primary objective is to control the incoming and outgoing network traffic by analyzing the data packets and determining whether it should be allowed through based on a predetermined rule set. A private network's firewall builds a bridge between an internal network that is assumed to be secure and trusted and another network, usually the Internet, which is not assumed to be secure and trusted.

SUMMARY

In one illustrative embodiment, a method, in a data processing system, is provided for deploying of an asset from a marketplace to a computing behind an enterprise firewall. The method comprises monitoring, by a grabber service in a cloud management computing device in a private network behind the enterprise firewall, a placeholder in a file system of a marketplace server. The method further comprises responsive to the grabber service finding a cloud asset deployment job stored in the placeholder, retrieving, by the grabber service, the cloud asset deployment job. The cloud asset deployment job comprises logic for deploying a cloud asset. The method further comprises downloading the cloud asset from a cloud asset repository to a cache behind the enterprise firewall according to the cloud asset deployment job. The method further comprises deploying the cloud asset according to the cloud asset deployment job.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
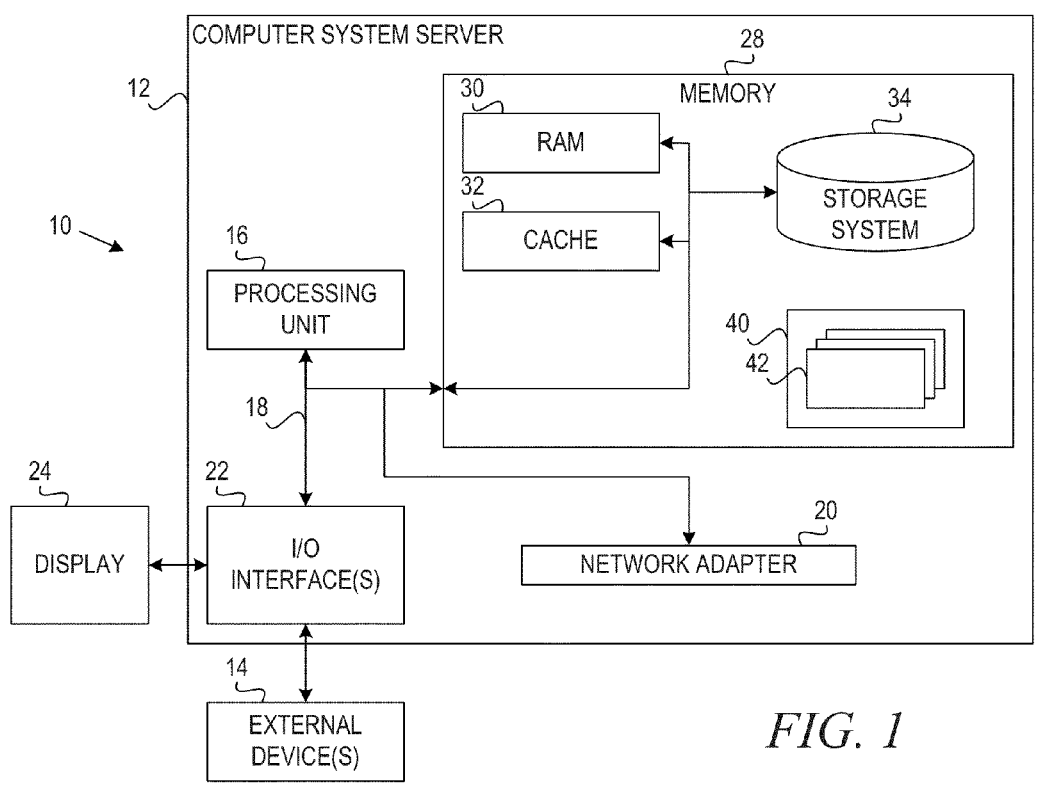
FIG. 1 depicts a cloud computing node according to an illustrative embodiment.

The illustrative embodiments provide a mechanism for one-click deployment of cloud assets on a private network. A Web-based cloud marketplace user selects an asset to be deployed. The mechanism of the illustrative embodiments deploys the asset on a computing device in a private network of an enterprise. The Web-based cloud marketplace may consolidate cloud assets from multiple cloud asset repositories. Responsive to the user selecting a cloud asset to be deployed, the marketplace server stores metadata for the deployment job in a placeholder for the customer. A grabber service running on a computing device within the private network monitors the placeholder to determine whether a deployment job has been added to the placeholder. A download server in the private network downloads the content of the cloud asset based on the deployment job. An agent within the private network deploys the asset to at least one computing device in the private network.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
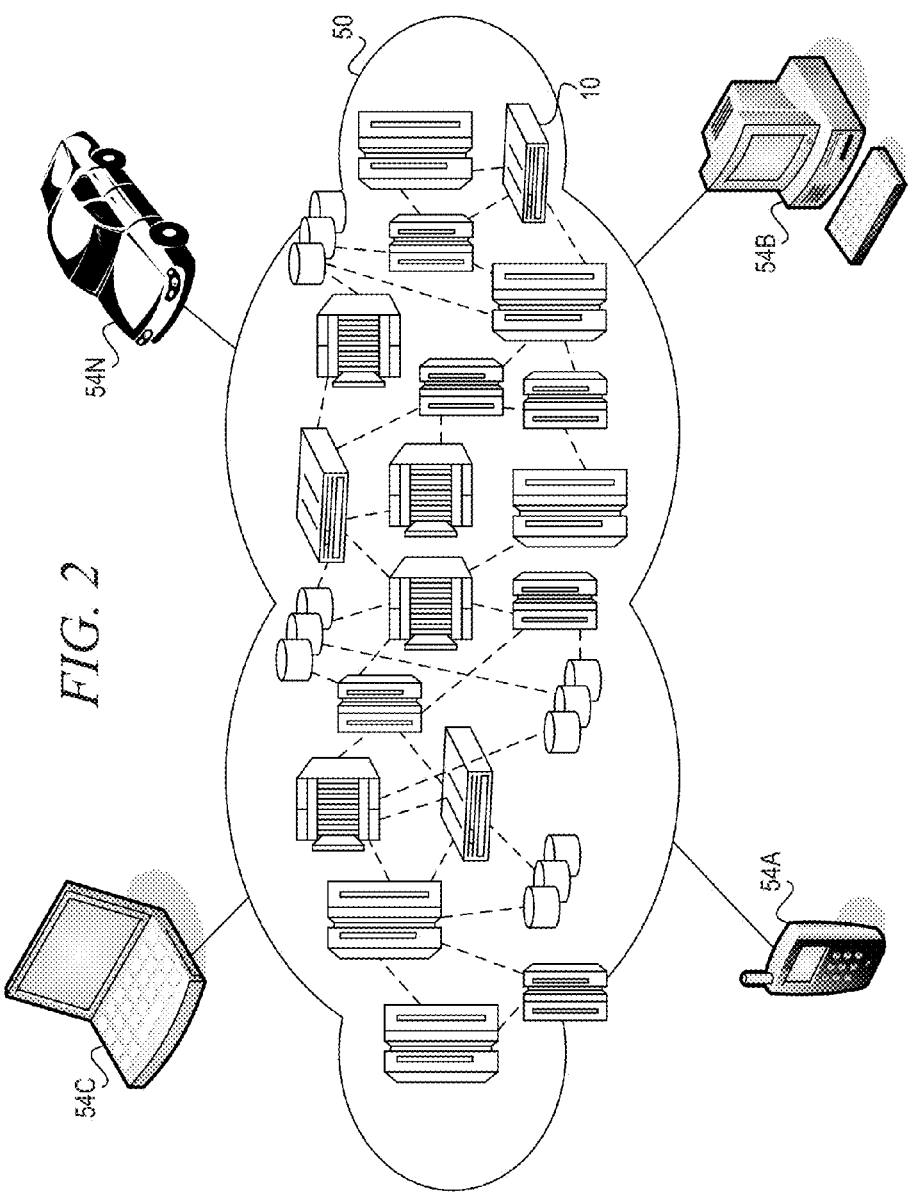
FIG. 2 depicts a cloud computing environment according an illustrative embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
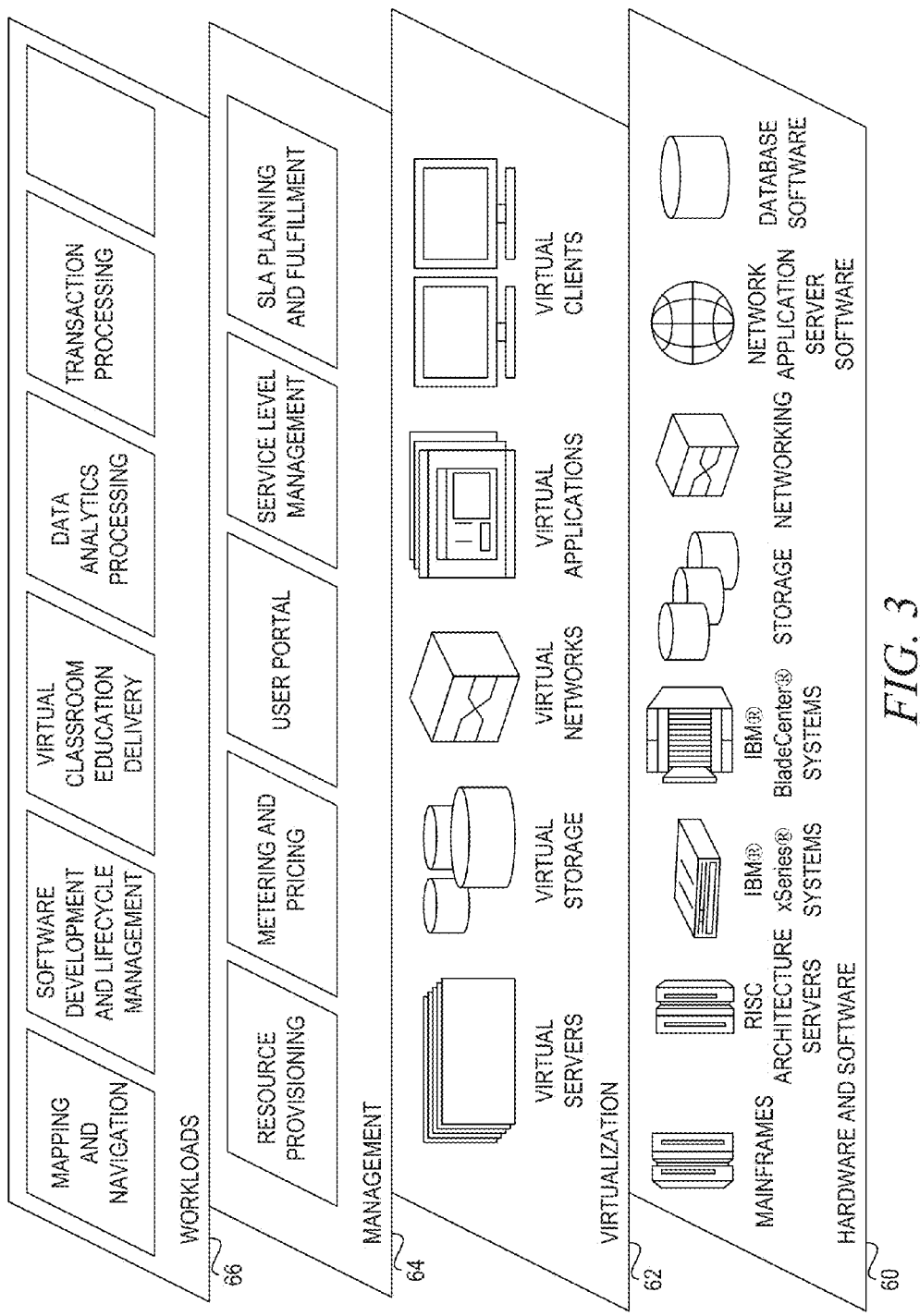
FIG. 3 depicts abstraction model layers according to an illustrative embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (JBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

Figure 4:
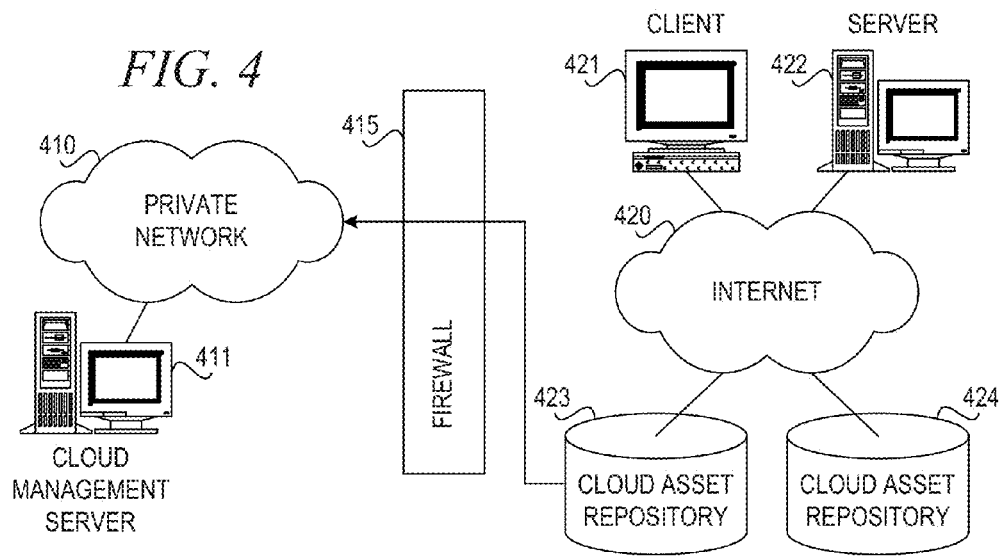
FIG. 4 depicts a pictorial representation of an example intranet and Internet data processing system in which aspects of the illustrative embodiments may be implemented.

FIG. 4 depicts a pictorial representation of an example intranet and Internet data processing system in which aspects of the illustrative embodiments may be implemented. Client 421 and server 422 connect to the Internet 420 or other wide area network. Server 422 provides access to cloud asset repositories 423, 424. The computing industry has seen a tremendous growth in the cloud computing domain and its subsequent adoption. As the popularity of some of the platforms has grown, developers across the world have contributed immensely in developing some fascinating cloud computing assets. Cloud asset repositories 423, 424 store cloud assets provided by developers.

However, there is a lack of deliver mechanisms of such applications in the cloud computing domain. Unlike what is seen in the mobile computing environment, there is no defined mechanism to deliver these assets to customers in private cloud environments. For example, private network 410 is isolated from the Internet 420 by firewall 415. A computing device connected to Internet 420 cannot access computing devices in private network 410 to deploy assets, such as cloud assets. Private network 410 and Internet 420 may be implemented as or within one or more cloud environments.

A current approach to deploying cloud assets in private networks is to manually download assets from various cloud marketplace catalogs, such as cloud asset repositories 423, 424, copy the assets into the private network 410 behind firewall 415, and import the assets into the private environment. Existing solutions allow a user to download the content in a local desktop and then manually transfer the content to a cloud management server, such as server 411.

The illustrative embodiments described herein provide a solution to deliver or stream cloud assets into customer private environments. The illustrative embodiments overcome the limitations of governance model for private networks, which does not allow a specific port to be "open," and of firewalls, which prevent access of virtual machines in private networks to the outside world. The illustrative embodiments provide a one-click deploy solution in which server 422 provides a cloud marketplace that aggregates cloud asset repositories 423, 424. While the depicted example shows two cloud asset repositories, the marketplace server 422 can provide a catalog for one cloud asset repository or aggregates many cloud asset repositories. Cloud marketplace server 422 may be a Web-based marketplace to select and deploy cloud assets. A user at client 421 may select an asset to be deployed to a cloud management server 411 in private network 410. The user may search for the content and then automatically install the content to cloud management server 411.

Figure 5:
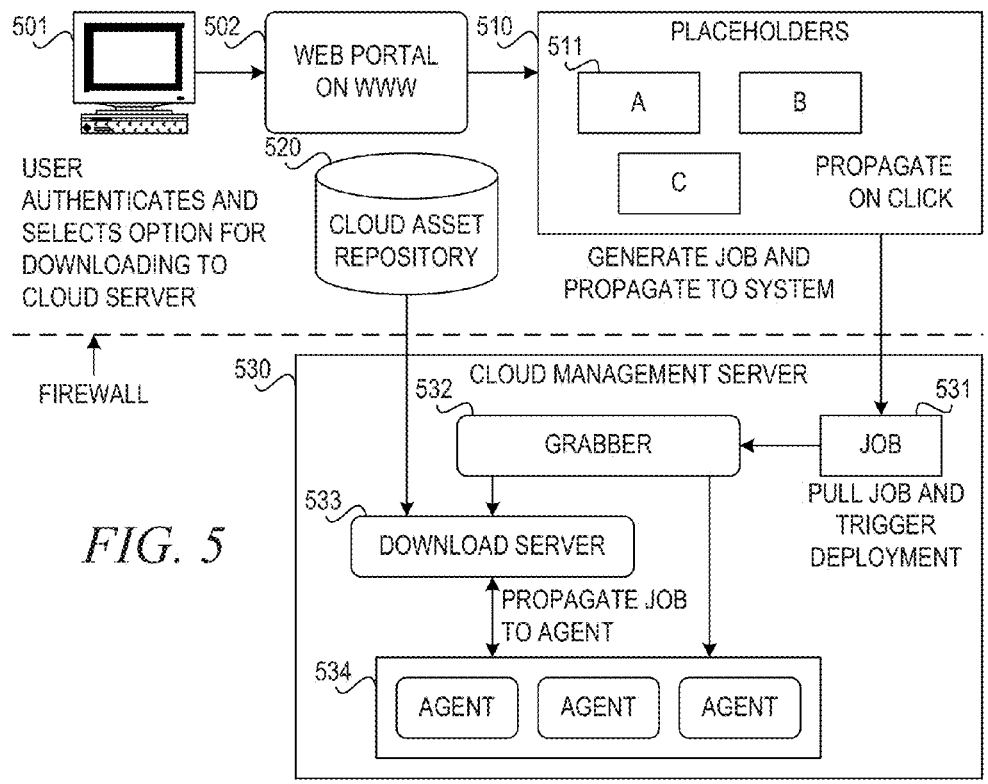
FIG. 5 is a block diagram illustrating a system for installing an asset from a marketplace to a private network in accordance with an illustrative embodiment.

FIG. 5 is a block diagram illustrating a system for installing an asset from a marketplace to a private network in accordance with an illustrative embodiment. A user at client 501 registers with Web portal 502 on the World Wide Web. The customer installs a grabber service 532, download server 533, and at least one agent 534 on a cloud management server 530 in a private network. Grabber service 532, download server 533, and the at least one agent 534 are installed behind the firewall. For each registered customer, Web portal 502 creates a placeholder 510. Web portal 502 generates a configuration file that points to the placeholder of the customer. Web portal 502 provides the configuration file to a grabber 532.

Client 501 then authenticates with Web portal 502 and the user browses one or more cloud asset repositories 520. The user selects a cloud asset from cloud asset repository 520. The user may select a cloud asset for deployment to cloud management server 530 in the private network. The user may select a cloud asset using a one-click control in Web portal 502, for example. Web portal 502 generates metadata for a job to deploy the cloud asset in the private network and places the job metadata in a placeholder for the customer, e.g., placeholder A 511. The job includes the logic to deploy the asset on a private cloud.

Grabber service 532 periodically connects to the marketplace backend file system to access its placeholder 511. In response to grabber service 532 discovering a job in placeholder 511, grabber service 532 pulls job 531 and triggers deployment.

Grabber service 532 may invoke download server 533 to download content for the cloud asset from cloud asset repository 520. Download server 533 stores the content in a cache (not shown).

Grabber service 532 also invokes an agent 534 to install the cloud asset to a computing device in the private network. Agent 534 may be implemented at the endpoint at which the cloud asset is to be deployed. The endpoint may be cloud management server 530 or some other computing device in the private network. Agents 534 may be implemented in multiple different endpoints. Agent 534 receives the content from the cache and performs the installation process as defined in the logic of job 531. The installation process may also include a process of uninstalling an asset being replaced, if necessary.

As will be appreciated by one skilled in the art, the present invention may be embodied as a system, method, or computer program product. Accordingly, aspects of the present invention may take the form of an entirety hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 6:
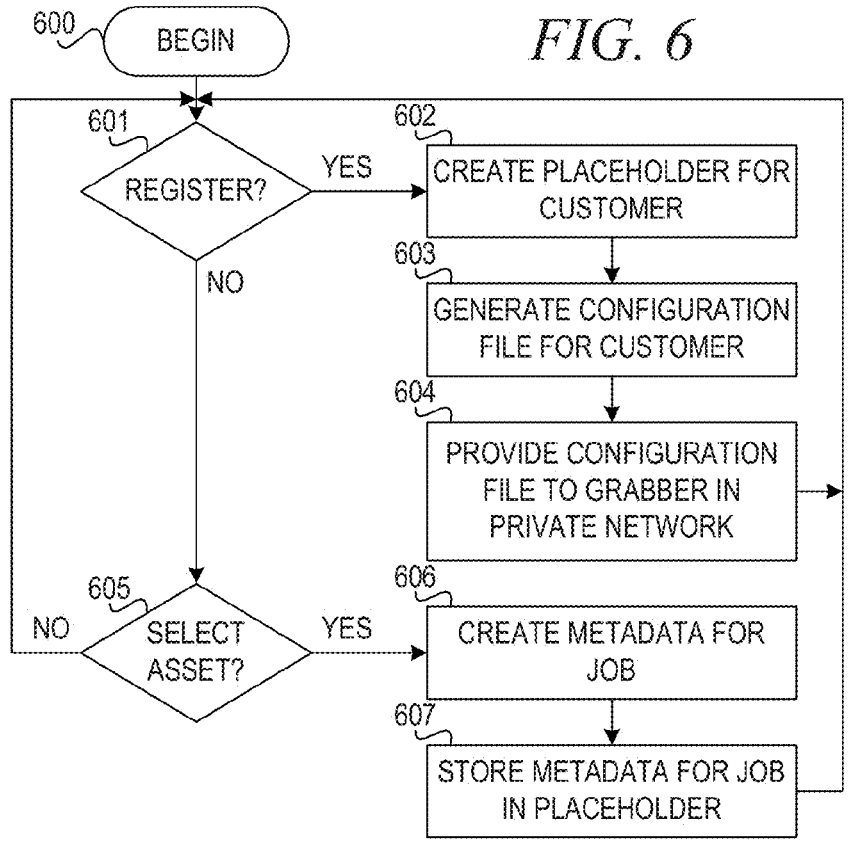
FIG. 6 is a flowchart illustrating operation of a Web-based cloud asset marketplace server in accordance with an illustrative embodiment.

FIG. 6 is a flowchart illustrating operation of a Web-based cloud asset marketplace server in accordance with an illustrative embodiment. Operation begins (block 600), and the server determines whether a customer registers with the marketplace (block 601). If a customer registers with the marketplace the server creates a placeholder for the customer in a backend file system (block 602). The server generates a configuration file for the customer that allows the customer to access the placeholder (block 603). The server then provides the configuration file to a grabber service in a private network of the customer (block 604). Thereafter, operation returns to block 601 to determine whether a customer registers with the marketplace.

If a customer does not register with the marketplace in block 601, the server determines whether a registered customer selects an asset for deployment (block 605). If a customer does not select an asset for deployment, operation returns to block 601 to determine whether a customer registers with the marketplace. If a customer selects a cloud asset for deployment to a private network in block 605, the server creates metadata for a cloud asset deployment job (bock 606). The server stores the metadata for the job in a placeholder for the customer (block 607). Thereafter, operation returns to block 601 to determine whether a customer registers with the marketplace.

Figure 7:
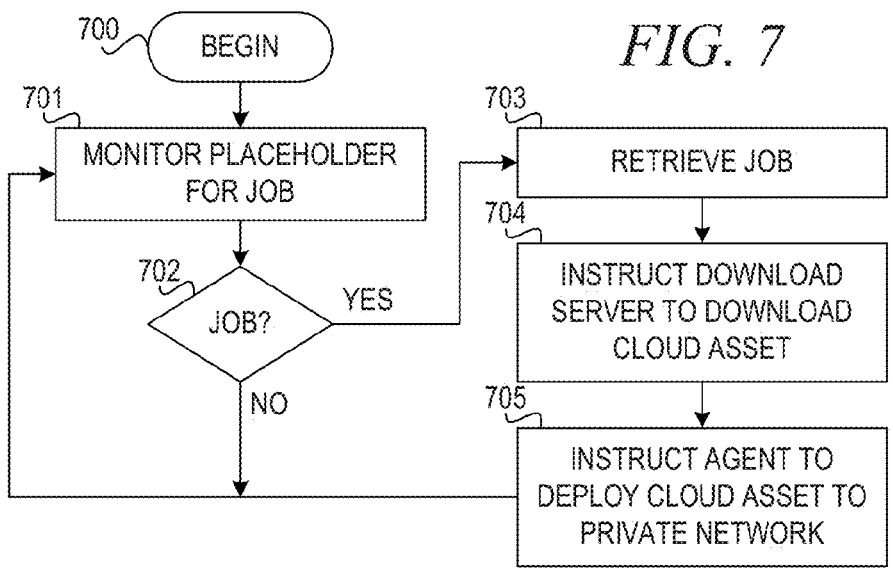
FIG. 7 is a flowchart illustrating operation of a cloud management server in a private network in accordance with an illustrative embodiment.

FIG. 7 is a flowchart illustrating operation of a cloud management server in a private network in accordance with an illustrative embodiment. Operation begins (block 700), and the server monitors a placeholder for a cloud asset deployment job (block 701) and determines whether a job is stored in the placeholder (block 702). If the a job is not stored in the placeholder, operation returns to block 701 to monitor the placeholder.

If a cloud asset deployment job is stored in the placeholder in block 701, a grabber service in the server retrieves the cloud asset deployment job (block 703). The grabber service instructs the download server to download the cloud asset (block 704). The grabber service then instructs an endpoint agent to deploy the cloud asset on the endpoint computing device (block 705). Thereafter, operation returns to block 701 to monitor the placeholder.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for installation of an asset from a marketplace to a cloud server behind an enterprise firewall. The marketplace application is deployed on the World Wide Web and allows customers to register with the marketplace to browse cloud assets. The marketplace may be integrated with multiple content/asset repositories. During registration, every customer is provided a placeholder that resides on the marketplace file system. Customers have components installed on a machine behind the firewall. The components have access to the Internet. A download server is installed in the customer premises behind the firewall. A grabber service connects to the marketplace backend file system. A configuration file includes customer details and provides information for accessing the placeholder.

When a customer chooses to deploy an asset from the marketplace, the marketplace application generates a job that has the logic to deploy the asset on a private cloud. The marketplace application places the job in the customer's placeholder. At the customer premises, the grabber service monitors the customer-specific placeholder and takes action in response to a job being found in the placeholder. The grabber service invokes the download server to download the asset and place it in a cache. The grabber service also invokes an endpoint agent to execute the job. An endpoint agent then connects to the download server to retrieve the asset and deploys the asset according to the logic in the job.

As noted above, it should be appreciated that the illustrative embodiments may take the form of an entirety hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for deploying of an asset from a marketplace to a computing device behind an enterprise firewall, the method comprising:
   monitoring, by a service in a cloud management computing device in a private network behind the enterprise firewall, a placeholder in a file system of a marketplace server;
   responsive to the service finding a cloud asset deployment job stored in the placeholder, retrieving, by the service, the cloud asset deployment job, wherein the cloud asset deployment job comprises logic for deploying a cloud asset;
   downloading the cloud asset from a cloud asset repository to a cache behind the enterprise firewall according to the cloud asset deployment job; and
   deploying the cloud asset according to the cloud asset deployment job.

2. The method of claim 1, wherein responsive to a customer registering with the marketplace server, the marketplace serer creates the placeholder in the file system and generates a configuration file for the customer.

3. The method of claim 2, wherein the service monitors the placeholder according to the configuration file.

4. The method of claim 2, wherein responsive to the customer selecting the cloud asset for deployment, the marketplace server generates the cloud asset deployment job and stores the cloud asset deployment job in the placeholder associated with the customer.

5. The method of claim 1, wherein the service invokes a download server to download the cloud asset to the cache.

6. The method of claim 1, wherein deploying the cloud asset comprises invoking an endpoint agent in an endpoint computing device in the private network, wherein the endpoint agent executes the logic of the cloud asset deployment job to deploy the cloud asset to the endpoint computing device.

7. The method of claim 1, wherein the marketplace server aggregates cloud assets from a plurality of cloud asset repositories.

8. A computer program product comprising a computer readable storage medium having a computer readable program stored therein, wherein the computer readable program, when executed on a computing device, causes the computing device to:
   monitor, by a service in a cloud management computing device in a private network behind the enterprise firewall, a placeholder in a file system of a marketplace server;
   responsive to the service finding a cloud asset deployment job stored in the placeholder, retrieve, by the service, the cloud asset deployment job, wherein the cloud asset deployment job comprises logic for deploying a cloud asset;
   download the cloud asset from a cloud asset repository to a cache behind the enterprise firewall according to the cloud asset deployment job; and
   deploy the cloud asset according to the cloud asset deployment job.

9. The computer program product of claim 8, wherein responsive to a customer registering with the marketplace server, the marketplace serer creates the placeholder in the file system and generates a configuration file for the customer.

10. The computer program product of claim 9, wherein the service monitors the placeholder according to the configuration file.

11. The computer program product of claim 9, wherein responsive to the customer selecting the cloud asset for deployment, the marketplace server generates the cloud asset deployment job and stores the cloud asset deployment job in the placeholder associated with the customer.

12. The computer program product of claim 8, wherein the service invokes a download server to download the cloud asset to the cache.

13. The computer program product of claim 8, wherein deploying the cloud asset comprises invoking an endpoint agent in an endpoint computing device in the private network, wherein the endpoint agent executes the logic of the cloud asset deployment job to deploy the cloud asset to the endpoint computing device.

14. The computer program product of claim 8, wherein the marketplace server aggregates cloud assets from a plurality of cloud asset repositories.

15. The computer program product of claim 8, wherein the computer readable program is stored in a computer readable storage medium in a data processing system and wherein the computer readable program was downloaded over a network from a remote data processing system.

16. The computer program product of claim 8, wherein the computer readable program is stored in a computer readable storage medium in a server data processing system and wherein the computer readable program is downloaded over a network to a remote data processing system for use in a computer readable storage medium with the remote system.

17. An apparatus, comprising:
a processor; and
a memory coupled to the processor, wherein the memory comprises instructions which, when executed by the processor, cause the processor to:
monitor, by a service in a cloud management computing device in a private network behind the enterprise firewall, a placeholder in a file system of a marketplace server;
responsive to the service finding a cloud asset deployment job stored in the placeholder, retrieve, by the service, the cloud asset deployment job, wherein the cloud asset deployment job comprises logic for deploying a cloud asset;
download the cloud asset from a cloud asset repository to a cache behind the enterprise firewall according to the cloud asset deployment job; and
deploy the cloud asset according to the cloud asset deployment job.

18. The apparatus of claim 17, wherein responsive to a customer registering with the marketplace server, the marketplace serer creates the placeholder in the file system and generates a configuration file for the customer.

19. The apparatus of claim 18, wherein the service monitors the placeholder according to the configuration file.

20. The apparatus of claim 18, wherein responsive to the customer selecting the cloud asset for deployment, the marketplace server generates the cloud asset deployment job and stores the cloud asset deployment job in the placeholder associated with the customer.

21. The apparatus of claim 17, wherein the service invokes a download server to download the cloud asset to the cache.

22. The apparatus of claim 17, wherein deploying the cloud asset comprises invoking an endpoint agent in an endpoint computing device in the private network, wherein the endpoint agent executes the logic of the cloud asset deployment job to deploy the cloud asset to the endpoint computing device.

23. The apparatus of claim 17, wherein the marketplace server aggregates cloud assets from a plurality of cloud asset repositories.

* * * * *